3,556,820
METHOD OF PRODUCING FRIT FOR CERAMIC BINDING OF ABRASIVE TOOL AND OF ABRASIVE TOOL CASING
Feodosy Grigorievich Ruban, Zapadinsky pereulok 44, kv. 1, and Sergei Nikolaevich Kovalev, Novo-Okruzhnaya ulitsa 17, kv. 22, both of Kiev, U.S.S.R.
No Drawing. Filed Oct. 9, 1967, Ser. No. 673,957
Int. Cl. C03c 5/02, 3/08; B24d 3/02
U.S. Cl. 106—48               1 Claim

ABSTRACT OF THE DISCLOSURE

A frit adapted for the ceramic binding of diamond tools and casings therefor comprising $SiO_2$, $B_2O_3$, $Al_2O_3$, $Na_2O$, $Li_2O$, $BaO$, $Fe_2O_3$, and $K_2O$.

---

The present invention relates to a frit for the ceramic binding of abrasive tools and of abrasive tool casings and to a method of producing said frit.

The invention also relates to a diamond tool and abrasive tool casing comprising said frit.

A frit for the ceramic binding of abrasive tools and abrasive tool casings, which consists of the oxides of silicon, boron, aluminum and natrium is known in the art.

A disadvantage of the known frit is that the manufacture of abrasive tool and abrasive tool casing comprising it takes place at high temperatures, which is explained by the high melting point of the frit.

Because of these high temperatures, the manufacture of diamond tools based on these known frits must take place in protective media.

The manufacture of diamond tools at high temperatures without protective media causes diamond graphitization.

In case of a temperature drop during the manufacturing of diamond tools, the frit fails to provide adequate binding of the diamond in the tool.

It is an object of the present invention to obtain the frit for the ceramic binding of abrasive tools and of abrasive tool casings, which has a lower melting point (about 700–800° C.) which would permit the manufacture of abrasive tools and its casings based on said frit at lower temperatures (about 680–800° C.) and, consequently, to manufacture the diamond tool without the need for protective media.

The above-mentioned and other objects of the invention are achieved by providing a frit on the basis of the oxides of silicon, boron, aluminum, and sodium comprising the oxides of lithium, barium, iron and potassium.

The frit of the invention comprises the following components (in weight percent):

| | |
|---|---|
| $SiO_2$ | 40.2–42.0 |
| $B_2O_3$ | 20.8–22.5 |
| $Al_2O_3$ | 5.2–6.0 |
| $Na_2O$ | 10.4–12.0 |
| $Li_2O$ | 4.5–5.5 |
| $BaO$ | 6.0–6.5 |
| $Fe_2O_3$ | 0.5–1.5 |
| $K_2O$ | 3.2–4.0 |

To produce the frit of the invention, it is necessary to melt a mixture comprising, according to the invention, 30 to 60 weight percent of pegmatite, 20 to 40 weight percent of sodium tetraborate, 3 to 30 weight percent of lithium carbonate, and 5 to 20 weight percent of barium nitrate.

Utilizing said frit, a diamond powder and a filler it is possible to manufacture a diamond tool comprising, as a filler, zirconium silicate, alumina and ceramic chamotte taken singly or in combination.

When used as a filler, zirconium silicate notably increases the wear resistance of the diamond tool.

The use of alumina results in a higher mechanical strength of the diamond tool.

Employing the ceramic chamotte imparts to the diamond tool a high porosity; the preset shape of the tool remaining intact.

The diamond tool may be manufactured on the basis of said frit, utilizing additives of aluminum, chromium and titanium taken singly or in combination.

If aluminum is used as an additive, the heat conductivity of the diamond tool increases markedly.

The use of chromium or titanium results in a marked increase in the efficiency of the diamond tool.

On the basis of said frit and a filler it is possible to make the casing of a diamond tool, utilizing, as a filler, zirconium silicate and alumina taken singly or in combination.

When combined with said frit, the above-mentioned fillers notably increase the mechanical strength of the casing for the abrasive tool (2 or 2.5 times as compared with the known casings).

The method of producing said frit is carried out as follows.

The components of the frit including pegmatite, sodium tetraborate, lithium carbonate and barium nitrate are being mixed and melted at 1050–1150° C. for some 1 or 2 hours.

Then the frit melt is poured in a vessel with water, after which said frit is taken out and subjected to fine grinding. The diamond tool and abrasive tool casing based on said frit are manufactured by known methods but at lower temperatures (about 680–800° C.).

Although the present invention has been described with reference to an exemplary embodiment thereof, various alterations and modifications can be made without departing from the spirit and scope of the invention, as those skilled in the art may easily understand.

These alterations and modifications are to be considered as falling within the essence and scope of the invention, as specified in the appended claim.

We claim:
1. A method of producing a frit adapted for the ceramic binding of abrasive tools and the casing for said abrasive tools, said frit having a specific melting point ranging from 700–800° C. and consisting essentially of the following composition:

| | |
|---|---|
| $SiO_2$ | 40.2–42.0 |
| $B_2O_3$ | 20.8–22.5 |
| $Al_2O_3$ | 5.2–6.0 |
| $Na_2O$ | 10.4–12.0 |
| $Li_2O$ | 4.5–5.5 |
| $BaO$ | 6.0–6.5 |
| $Fe_2O_3$ | 0.5–1.5 |
| $K_2O$ | 3.2–4.0 | which consists essentially in melting a mixture made up of 30 to 60 weight percent of pegmatite, 20 to 40 weight percent of sodium tetraborate, 3 to 30 weight percent of lithium carbonate and 5 to 20 weight percent of barium nitrate.

References Cited

UNITED STATES PATENTS 3,158,515  11/1964  Michael _____ 106—54

OTHER REFERENCES

Berry, L. G., and Mason, Brian, Mineralogy-Concepts, Descriptions, Determinations, San Francisco and London, W. H. Freeman and Company, 1959, pp. 224–225. Library of Congress Catalogue Card Number 59–7841.

TOBIAS E. LEVOW, Primary Examiner

M. L. BELL, Assistant Examiner

U.S. Cl. X.R.

106—54; 51—307